United States Patent Office 3,083,234
Patented Mar. 26, 1963

3,083,234
PROCESS FOR PREPARING BIS(m-PHENOXY-PHENYL) ETHER
Karl J. Sax, Orinda, Calif., assignor to Shell Oil Company, New York, N.Y., a corporation of Delaware
No Drawing. Filed Feb. 5, 1960, Ser. No. 6,856
1 Claim. (Cl. 260—613)

This invention relates to a process for preparing polyaromatic ethers and, more particularly, to an improved process for preparing polyphenyl ethers.

Polyphenyl ethers such as 1,3-diphenoxybenzene are useful as insecticides, hydraulic fluids and heat transfer agents. In general, they are prepared by the conventional Ullmann ether synthesis described by Ullmann et al., Ber. 38, 2211 (1905). In that synthesis the alkali metal salt of a phenol is reacted with the haloaromatic compound in the presence of copper catalyst to yield polyphenyl ether and the alkali metal halide. The reaction is conventionally conducted under anhydrous conditions by adding the haloaromatic compound to the molten alkali metal phenate and catalyst at temperatures of about 150°–250° C. Alternatively, the reaction may be conducted by reacting together a phenol and a halobenzene in the presence of potassium hydroxide and the copper catalyst, see Ullmann et al., Ber. 39, 623 (1906). In this type of reaction, the phenate is formed in situ by reaction of the phenol with the alkali metal hydroxide.

In both types of reactions, the condensation between the phenate and the haloaromatic is violently exothermic and difficult to control. Thus, once the mixture has begun to react, sufficient heat is evolved to keep it boiling even in the absence of externally supplied heat. When conducted with substantial amounts of reactants, the condensation is accompanied by the formation of "hot spots" in the reaction mixture, resulting from poor heat transfer or mixing therein, and the yields of product are reduced because of the formation of by-products and degraded reaction products. Control of the reactions by cooling or other means is difficult and, in general, the methods are not very well suited to large-scale preparation of polyphenyl ethers.

It is an object of this invention to provide a process for preparing polyphenyl ethers from phenols and halobenzenes easily, conveniently, and in improved yield. A further object of the invention is the provision of an improved method for carrying out the Ullmann ether synthesis. The provision of a method for synthesizing polyphenyl ethers at a controlled rate is another object of the invention as is a method for controlling the temperature of the condensation reaction. Other objects will be apparent from the following description of the invention.

These objects are accomplished in the process for preparing a polyphenyl ether by the condensation of alkali metal phenate with halobenzene in the presence of copper catalyst by the improvement which comprises controllably adding aqueous alkali metal hydroxide to a mixture comprising a phenol, a halogenated aromatic compound and a copper-containing catalyst, said mixture having a temperature in excess of about 150° C., and separating the polyphenyl ether therefrom. By polyphenyl ether is meant a compound having at least two aromatic nuclei, preferably phenyl or phenylene rings, connected to one another by an oxy radical, i.e., a divalent oxygen atom —O—. Typical polyphenyl ethers are diphenyl oxide; 1,3-bis(phenoxy)benzene; 1,3,5-tris(phenoxy)benzene; bis(p-phenoxyphenyl)ether, and the like. The invention is most employed for the preparation of polyphenyl ethers having from 2 to 10 aromatic nuclei interconnected by from 1 to 9 divalent oxy radicals and is preferably employed in the preparation of such ethers having from 3 to 5 mononuclear aromatic radicals so interconnected.

As has been noted, these ethers have been conventionally prepared by reacting together a monohydroxy phenol or an alkali metal phenate thereof with a halobenzene in the presence of a copper catalyst. If a phenol is employed, the solid alkali metal hydroxide is required in order to yield the phenate in situ. In the instant invention, however, the reaction is conducted by adding the aqueous caustic to the mixture of the phenol, the haloaromatic compound, and the copper catalyst. Reactant phenols include phenol itself and substituted phenols such as alkylated phenols, e.g., p-cresol, 3,5-xylenol, mesitol and durenol. Other substituents on the hydroxybenzene nucleus that afford useful ethers include phenyl groups, i.e., the phenyl phenols, and alkoxy or phenoxy groups. For example, polyphenyl ethers may be readily prepared by employing p-phenoxy phenol as a phenolic reactant in the Ullmann synthesis.

The preferred phenolic reactants are those consisting of a monohydroxybenzene having up to three substituents, each substituent being selected from the group consisting of alkyl, alkoxy, phenyl and phenoxy radicals, wherein each of the radicals has up to ten carbon atoms. Most preferred are the phenols having up to one of these substituents, i.e., phenol itself and monoalkylphenol, monoalkoxyphenol, monophenylphenol and monophenoxyphenol, the substituents being on any ring carbon atom relative to the hydroxyl groups. Typical reactants of these types include p-cresol; 3,5-diethylphenol; p-t-butylphenol; o-hydroxyanisole; p-butoxyphenol; o-phenylphenol; m-phenoxyphenol; o-naphthylphenol, and the like.

The haloaromatic reactant with which the phenolic compound is condensed may be an aromatic hydrocarbon, such as a benzene or a naphthalene nucleus, provided with up to four halogen substituents on each nucleus. If there are more than four halogen substituents, steric hindrance among the halogens renders the ether-forming reaction undesirably slow. Typical of such compounds are chloronaphthalene, dibromonaphthalene, methylbromonaphthalene and tetrabromobenzene. The preferred class of haloaromatic compounds are those benzenes having up to three halogen substituents and wherein each halogen atom is attached to a ring carbon atom so situated that neither of the adjacent ring carbon atoms to which it is connected is halogenated, e.g., 1,3,5-tribromobenzene; 1,3- and 1,4-dichlorobenzene; and the monohalobenzenes such as iodobenzene and bromobenzene. The preferred halogen substituents are bromine and chlorine, the most reactive under the conditions of the Ullmann ether synthesis.

In addition to their halogen substituents, the haloaromatic reactants may be substituted with such other non-reactive substituents as alkyl groups, aryl groups, aralkyl groups and aryloxy and alkoxy groups. Examples of haloaromatic compounds so substituted include p-methylbromobenzene; 3,5-dibromo-2,4-xylene; p-phenylchlorobenzene; m-bromophenyl toluene; p-bromocumene; p-alpha-cumyl-bromobenzene; and o-chloroanisole. In these compounds, the number of carbon atoms in the hydrocarbon portion of the substituent is most conveniently restricted to twelve or so, or the reactivity of the compound is somewhat reduced. Particularly preferred of the substituted haloaromatic compounds are the aryloxy haloaromatic compounds typified by o-phenoxybromobenzene and m-phenoxychlorobenzene, since by using such phenoxy haloaromatics as these, polyphenyl ether molecules having three or more phenyl nuclei may be rapidly and conveniently prepared by means of the process of the invention. For example, bis(phenoxyphenyl)ethers are rapidly prepared in high yield by reacting together under the conditions of the invention a phenoxyphenol and a phenoxy-halobenzene while adding aqueous caustic. Also, by heating together p-phenoxyphenol and p-dibromobenzene at about 175° C. in a molar ratio of about 2 to 1 while adding aqueous KOH the ether bis(p-phenoxyphenoxy)benzene is efficiently prepared.

It should be noted that by controlling the proportions of phenolic reactant condensed with the halobenzene less than all of the halogen substituents may be reacted and halophenyl ethers are obtained as products. For example, when one mole of phenol is reacted with one or more moles of a dibromobenzene under the conditions of the invention, the principal product is a bromophenyl phenyl ether; when two moles of phenol are reacted with one of a dibromobenzene, the product is a bis(phenoxy)benzene.

The copper-containing catalyst employed is that conventionally used in the Ullmann ether condensation. Finely divided copper metal powder is preferred as the most satisfactory catalyst, although copper alloys, e.g., copper bronze, are also frequently used. Copper salts, including cupric chloride, cuprous chloride, cuprous bromide, cuprous iodide, cupric acetate, copper tartrate, copper oxide and copper sulfate are also known to catalyze the condensation.

The process of the invention is most conveniently conducted by mixing the phenolic reactant and the halobenzene with the copper catalyst and heating the mixture to a temperature of about 150° C. or above. The reaction is preferably conducted at a temperature below about 250° C., the most preferred range being between about 175° C. and about 210° C. The proportions of reactants are not critical, but the most convenient ratios are those from about five moles of the phenolic compound to one of the haloaromatic to one of the phenol to five of the haloaromatic. Only catalytic amounts of the copper catalyst are required, and amounts of catalyst from about 0.01% by weight, based on the phenol, to about 10% by weight on the same basis, have been found to give convenient condensation rates.

The mixture of the phenolic and the haloaromatic reactants and the copper catalyst will not react to form the desired polyphenyl ether until the alkali metal hydroxide is present in the reaction mixture. While any of the alkali metal hydroxides, e.g., sodium hydroxide, lithium hydroxide, potassium hydroxide, are operative, the conventional and preferred hydroxide is potassium hydroxide.

In general the Ullmann ether synthesis is known to be inhibited by the presence of water in the system, and the procedure is generally carried out in such a manner that water is excluded from the reaction mixture. For example, when the phenoxide is prepared in situ, dry solid hydroxide is used and the reaction is carried out at such high temperatures that the water resulting from the reaction of the phenol and the hydroxide is immediately removed from the reaction mixture.

Unexpectedly, however, it has been found that the preparation of polyphenyl ethers from phenols and haloaromatic hydrocarbons proceeds much more smoothly and controllably if an aqueous solution of alkali metal hydroxide is added to the mixture comprising the phenolic and halobenzene reactant and the copper catalyst. The chief advantage of this method is that the phenate intermediate may be thus prepared from the phenol at a controlled rate such that the condensation will not proceed in too violent a manner. The formation of hot spots and undesired degradation products in the mixture is thus avoided. Furthermore, the temperature of the reaction may be maintained at any desired temperature, despite the violently exothermic nature of the condensation by controlling the rate of addition and amount of water added. In this way, much of the heat produced in the reaction may be removed by employing it to volatilize the added water. Furthermore, by conducting the condensation as described herein, the reaction is not inhibited by the added water and higher yields of polyphenyl ether are obtained.

The aqueous alkali metal hydroxide solution added to the reaction mixture may include the hydroxide in any concentration. However, if extremely large amounts of water relative to the hydroxide are employed, the reactants and particularly the halobenzene tend to be steam-distilled with the volatilized water from the mixture during reaction. As a consequence, the preferred concentration of alkali metal hydroxide in the aqueous solution is that between 40% w. and saturation. For example, with potassium hydroxide solution at 20° C., the range of preferred concentrations will be from about 40% w. to about 53% w.

This caustic solution is preferably added to the reaction mixture in a controlled continuous or semi-continuous manner in such a way that the condensation proceeds smoothly and does not get out of control. The reaction mixture is maintained at a temperature between about 100° C. and its boiling temperature by the addition, and the resulting steam is allowed to escape. Since some of the reactants do tend to steam-distill off with the steam, it is usually desirable to condense the effluent vapor from the reaction and return the organic phase to the reaction mixture. The inert blanket of water vapor provided over the reaction mixture by the steam tends to suppress the oxidation of the mixture, thus enhancing the high yield of the process.

The rate of phenate formation from the caustic and phenolic reactant and of ether formation from the phenate and halobenzene are almost instantaneous at the reaction temperatures described, so that the molar amount of ether formed will always be equal or proportional to the molar amount of caustic added. As a consequence, the total amount of alkali metal hydroxide required will be proportional to the molar amount of ether formed. It is obvious that another advantage of the invention is therefore the fact that by employing this process the condensation may be conducted to any desired degree of completion merely by stopping the addition of aqueous caustic at that point.

It will be seen from this description that the aqueous caustic may be added to the reaction mixture intermittently or continuously and at varying rates. The preferred rate of addition of the caustic solution is that rate at which the reaction temperature is maintained at some defined point or range. An automatic system which will feed the caustic to the reaction system as a function of temperature is thus rendered possible.

The temperature of the reaction may easily be maintained at the desired point or within the desired range by controlling the rate of addition of the aqueous caustic solution so that the added hydroxide is instantaneously reacted with the phenolic compound to yield the corresponding phenate. The heat evolved by this and the subsequent reaction between the phenate and the halobenzene is employed to volatilize the water added. In this way, the accumulation of excess alkali metal hydroxide in the system is avoided, as is the consequent tendency of the reaction to proceed at an uncontrollable rate.

The constant volatilization of the water added with the aqueous caustic serves, as has been pointed out, to carry off the heat of reaction. It is desirable to employ a concentration of alkali and to add the aqueous caustic at a rate such that the amount of water volatilized at any given time is approximately equal to the amount of water being added with the aqueous caustic at that time. The rate of addition of water will thus substantially correspond to the rate of volatilization of the water, and the reaction temperature will be held constant. If the too dilute aqueous alkali solution is added at too great a rate, the excess water introduced into the system will tend to cool the system below reaction temperature and reduce the reaction rate. For this reason, the concentration and rate of addition of the aqueous alkali metal hydroxide should be such that the reaction temperature is maintained at the desired point or within the desired range.

By conducting the reaction in the manner described, it will be seen that there will always be present in the reaction medium a relatively small amount of the phenate intermediate, and an excess of both the phenolic reactant and of the halobenzene reactant. The condensation reaction is conducted in the liquid phase, and the excess reactants thus serve as diluents and heat-transfer agents. The use of supplementary inert diluents, such as high-boiling paraffins, aromatics, ethers, and the like, while possible, is not necessary.

One important advantage of the process of this invention is the fact that at no time does the reaction mixture contain excess base. As the aqueous caustic is added to the reaction mixture, it is used up at a high rate with the consequent production of alkali metal halide. Since excess base is known to catalyze the production of undesired by-products such as tars, it is believed that the high yields of polyphenyl ethers produced by the process described herein results in large part from the unavailability of such base for these yield-reducing side reactions.

To illustrate further the novel process of the invention, the following specific examples thereof are set forth. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

Example I

To a reaction flask fitted with a dropping funnel was charged 159 grams (0.854 mole) of mixed phenoxyphenol isomers, 99.1 g. (0.42 mole) of mixed dibromobenzene isomers, and 0.5 g. finely divided copper metal catalyst. The mixture was heated to 180° C. with stirring, and to it was added dropwise a solution of 48 g. of potassium hydroxide in 35 ml. of water. At the beginning of this addition, the temperature of the reaction mixture rose to 180–185° C. where it was maintained by controlled addition of the remaining caustic. The distillate, comprising water and dibromobenzene, was collected and from time to time the organic phase was returned to the reaction mixture.

After all of the aqueous potassium hydroxide was added, the mixture was cooled, diluted with xylene, washed with caustic and with water, and dried over anhydrous magnesium sulfate.

The mixture was then filtered to remove the drying agent, and the xylene removed by distillation. The residue was fractionally distilled, and in this manner a 136 g. yield of di(phenoxyphenoxy) benzene, 73.0%, based on the dibromobenzene, was obtained. The polyphenyl ether was a light-yellow liquid having a boiling point of 270°–280° C. at 0.1 mm.

Example II

To a mixture of 303 g. of phenol, 1115 g. of technical grade m-dibromobenzene and 11 g. of metallic copper catalyst at 190° C. was added slowly a total of 130 ml. of an aqueous solution containing 130 g. of potassium hydroxide while distilling off the water.

After all of the caustic had been added, the reaction mixture was worked up as in the previous example and 554 g. of dibromobenzene recovered. A total of 368 g. (62.6% yield) of m-bromophenyl phenyl ether, having a boiling point of 200–203° C. at 50 mm., was obtained.

Example III

A 100-gallon stainless steel autoclave was charged with 5 pounds copper powder catalyst, 662 pounds mixed dibromobenzene (2.8 lb.-mole), and 165 pounds phenol (1.75 lb.-mole). The mixture was heated with stirring to 175° C. and 167 pounds 48% caustic potash (1.4 lb.-mole) pumped in over a 4-hour period at 175–185° C. Water and dibromobenzene distilling out of the autoclave were condensed and the lower organic layer returned intermittently to the autoclave. After addition was complete, the charge was stirred at 175–185° C. for two more hours and then cooled.

The reaction slurry was pressured out of the autoclave under 50 p.s.i.g. nitrogen pressure through a sparkler filter. The autoclave and filter cake were washed twice by charging a drum of toluene to the autoclave and straining through the filter.

Three runs were made in this manner. The filtrates and washings were combined and charged to the 250-gallon stainless steel batch still. The charge was first topped to 125° C. at 100 mm. to remove toluene and then the excess dibromobenzene separated by taking a 135–145° C. cut. Ninety-six percent of the theoretical excess dibromobenzene was recovered. The pressure was then reduced to 10 mm. and bromophenyl phenyl ether distilled at 135–145° C.

The yield of mix-bromophenyl phenyl ether was 741 pounds or 70.7% w. on potassium hydroxide.

Example IV

To a stirred mixture of 233 g. of technical grade m-phenoxyphenol, 299 g. of technical grade m-bromophenyl phenyl ether, and 8 g. of finely divided copper metal catalyst at 180° C. was added 60 ml. of an aqueous solution containing 70 g. of potassium hydroxide. The caustic was added slowly over a period of about one-half hour to maintain the temperature of the reaction mixture between about 180–190° C., while condensing the distillate and returning the organic phase to the reaction mixture. After the caustic had been added, the mixture was heated at 170–190° C. for an additional two and one-half hours, cooled, and poured into an excess of xylene.

The xylene mixture was then extracted twice with 5% aqueous caustic, washed with water, dried over anhydrous magnesium sulfate, filtered, and distilled. The xylene was removed under reduced pressure and the residue fractionally distilled. In this way an 80% yield of bis(m-phenoxyphenyl)ether, 342 g., was obtained, having a boiling point of about 220° C. at 180 microns of pressure.

Example V

A 100-gallon stainless steel autoclave was charged with 5 pounds of copper powder catalyst, 662 pounds dibromobenzene (85% m-, 9% p-, and 6% o-dibromobenzene) (2.8 lb.-moles) and 165 pounds of phenol (1.75 lb.-moles). The mixture was treated with stirring to 175° C., and 167 pounds of 48% w. aqueous potassium hydroxide (1.4 lb.-moles) pumped in over a 4-hour period at 175–185° C. Water and dibromobenzene distilling out of the autoclave were condensed and the lower organic layer returned intermittently to the autoclave.

After the addition was complete, the charge was stirred at 175–185° C. for two more hours and cooled. The reaction slurry was then pumped out of the autoclave under 50 p.s.i.g. nitrogen pressure, filtered, and fractionally distilled. The product, bromophenyl phenyl ether, was recovered in 70.7% yield, based on the KOH, and was distilled off at 135–145° C. and 10 mm. Hg.

Example VI

To a 100-gallon stainless steel autoclave was charged 139 pounds (0.75 lb.-mole) phenoxyphenol (85% m-, 9% p-, 6% o-), 87 pounds (0.37 lb.-mole) dibromobenzene having the same isomer distribution as above and 3.5 pounds of cuprous oxide. The charge was heated with stiring to 180° C. and 88 pounds (0.76 lb.-mole) 48.4% w. aqueous potassium hydroxide added over a two-hour period while maintaining a 180–185° C. reaction temperature. The water and dibromobenzene which distilled overhead were condensed and the lower organic layer intermittently returned to the autoclave.

After addition was complete, the charge was stirred at 185–190° C. for 1.5 hours, cooled to 60° C., diluted with 120 pounds of benzene, and removed from the autoclave and filtered. The autoclave and filter were washed with additional benzene, and the filtrate washed with 10% w. aqueous caustic.

The washed benzene solution was then fractionally distilled, first at 125–135° C. at atmospheric pressure, and then at 125–130° C. and 75 mm. The resulting bottoms were distilled in a molecular still at 15–20 microns to remove light ends boiling below 180° C. The bulk of the product was then distilled at 200° C. The yield of the desired mixed bis(phenoxyphenoxy)benzenes was better than 60%.

I claim as my invention:

The process for preparing bis(m-phenoxyphenyl) ether which comprises reacting together equimolar amounts of m-phenoxyphenol and m-bromophenyl phenyl ether in the presence of a catalytic amount of copper, at a temperature between 150–250° C., while adding to the reaction mixture during the reaction an aqueous solution of potassium hydroxide in substantially stoichiometric amount at a rate controlled so as to maintain a substantially constant temperature.

References Cited in the file of this patent

UNITED STATES PATENTS 2,060,716    Arvin  ---------------- Nov. 10, 1936

FOREIGN PATENTS 1,189,050    France  ---------------- Mar. 16, 1959

OTHER REFERENCES

Huang: Jour. Chem. Soc., October 1958, pages 3725–3726.